United States Patent [19]

Freitag et al.

[11] Patent Number: 4,533,702

[45] Date of Patent: Aug. 6, 1985

[54] AROMATIC POLYESTER CARBONATES HAVING A HIGH NOTCHED IMPACT STRENGTH AND A PROCESS FOR THE PRODUCTION THEREOF

[75] Inventors: Dieter Freitag; Ludwig Bottenbruch; Manfred Schmidt, all of Krefeld, Fed. Rep. of Germany

[73] Assignee: Bayer Aktiengesellschaft, Leverkusen, Fed. Rep. of Germany

[21] Appl. No.: 623,823

[22] Filed: Jun. 22, 1984

Related U.S. Application Data

[63] Continuation-in-part of Ser. No. 504,292, Jun. 15, 1983, abandoned.

[30] Foreign Application Priority Data

Jun. 26, 1982 [DE] Fed. Rep. of Germany ....... 3223980

[51] Int. Cl.$^3$ ..................... C08L 67/02; C08L 69/00; C08G 63/64
[52] U.S. Cl. .................................. 525/439; 528/176
[58] Field of Search ................. 525/439; 528/176, 177

[56] References Cited

U.S. PATENT DOCUMENTS

| | | | |
|---|---|---|---|
| 3,030,331 | 4/1962 | Goldberg | 528/176 |
| 3,169,121 | 2/1965 | Goldberg | 528/176 |
| 3,398,212 | 8/1968 | Jackson | 528/173 |
| 3,399,172 | 8/1968 | Jaquiss | 528/173 |
| 3,792,115 | 2/1974 | Kishikawa | 525/439 |
| 4,156,069 | 5/1979 | Prevorsek | 528/176 |
| 4,238,597 | 12/1980 | Markezich | 525/439 |
| 4,286,075 | 8/1981 | Robeson | 525/439 |
| 4,386,186 | 5/1983 | Maresca | 525/439 |

Primary Examiner—John C. Bleutge
Assistant Examiner—Patricia Short
Attorney, Agent, or Firm—Connolly and Hutz

[57] ABSTRACT

Aromatic polyester carbonates may be produced by melt-extruding solutions of aromatic polyesters and aromatic polycarbonates.

6 Claims, No Drawings

AROMATIC POLYESTER CARBONATES HAVING A HIGH NOTCHED IMPACT STRENGTH AND A PROCESS FOR THE PRODUCTION THEREOF

This application is a continuation-in-part application of parent application Ser. No. 504 292, filed June 15, 1983, now abandoned.

This invention relates to aromatic polyester carbonates having an increased notched impact strength and to a process for the production thereof from solutions which contain aromatic polyester and aromatic polycarbonate.

Aromatic polyester carbonates are known (G. S. Kolesnikov et al., J. Polym. Sci. USSR, Vol. 9, 1705–1711 (1967); U.S. Pat. Nos. 3,030,331; 3,169,121 and 3,409,704; German Offengungsschriften Nos. 2,714,544; 2,758,030 and 3,007,934). They are preferably produced according to the two-phase interface process from diphenolate, dicarboxylic acid dichloride and phosgene.

While, for example, the co-extrusion of aromatic polyesters and aromatic polycarbonates results in polyester/polycarbonate alloys (see, for example, German Pat. No. 2,211,202, U.S. Pat. Nos. 3,398,212 and 3,399,172), surprisingly a transesterification takes place at elevated temperatures in the presence of solvents. The process according to the present invention represents a sophisticated method of producing aromatic polyester carbonates.

The present invention provides a process for the production of aromatic polyester carbonates having a molar ratio of ester groups to carbonate groups of from 20:1 to 1:20, preferably from 9:1 to 2:8, characterised in that a solvent-containing mixture which contains (a) aromatic polyester and (b) aromatic polycarbonate in the required ratio, and from 5 to 80%, preferably from 20 to 70% by weight, of organic solvent (based on solvent-containing mixture) is melt-extruded at a temperature of from 200° to 440° C., preferably from 220° to 360° C., more preferably from 310° to 360° C., for a residence time of from 20 to 200 sec., preferably from 25 to 120 sec., while removing the solvent, optionally under reduced pressure, and maintaining the liquid condition, until the reaction product only has a single glass transition temperature.

The solvent content of the mixture may be reduced by a previous evaporation step, in which case the mixture is freed from solvent in such a quantity, that at least 5%, by weight, of solvent, based on the sum of resin mixture and solvent, remain in the mixture. This can be done under normal pressure or reduced pressure.

The transesterification is appropriately carried out in an evaporation extruder. The temperature is increased and the pressure is reduced, preferably in a continuous manner, with intensive mixing. The opalescence, caused by the different refractive indices of the two starting polycondensates disappears during the reaction. At the end of transesterification, the occurrence of a single glass transition temperature indicates that a co-condensate has resulted from the mixture which was used. Compared to aromatic polyester carbonates produced by the two-phase interface process, the aromatic polyester carbonates produced according to the present invention clearly have a higher notched impact strength and flowability.

The glass transition temperature may be determined by, for example, measuring the shear modulus of films produced from solutions.

Extruders which are preferred for the present process are described in, for example, German Offenlegungsschrift No. 1,404,984 and in German Auslegeschriften Nos. 1,209,741 (Examples) and 1,404,237.

The following organic solvents are preferred for the present process: methylene chloride, chloroform, tetrachloroethane, trichloroethylene, tetrachloroethylene, chlorobenzene, dichlorobenzene, toluene, xylene, anisole or mixtures thereof (see German Offenlegungsschriften Nos. 2,570,533; 1,595,762; 2,116,974; 2,113,345 and 2,500,092; U.K. Pat. No. 1,079,821 and U.S. Pat. No. 3,511,514).

Aromatic polyesters (a) within the sense of the present invention include polyesters containing iso-and/or tere-phthalic acid radicals, diphenol radicals, radicals of chain terminators and optionally of branching agents having relative viscosities of from 1.18 to 2.9, preferably from 1.2 to 1.5 (measured using a solution of 0.5 g of polyester in 100 ml of dichloromethane solution at 25° C.). They are described in, for example, the monograph "Polyesters" by V. V. Korshak and S. V. Vinogradova, Pergamon Press, Oxford 1965, pages 454–455, 485–486, and 494.

Preferred diphenols for the production of the aromatic polyesters (a) include compounds corresponding to the following general formula

$$HO-Z-OH \quad (I)$$

wherein Z represents a divalent, mono- or poly-nuclear aromatic radical having from 6 to 30 carbon atoms; and Z is such that the two OH groups are directly bound to different carbon atoms of the aromatic system.

Diphenols which are particularly preferred include compounds corresponding to the following general formula:

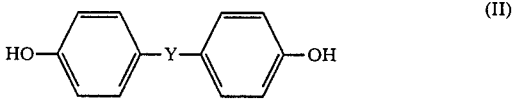

(II)

wherein Y represents a single bond, an alkylene or alkylidene radical having from 1 to 7 carbon atoms, a cycloalkylene or cycloalkylidene radical having from 5 to 12 carbon atoms,

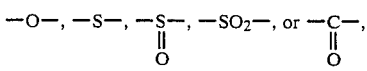

and nucleus-alkylated and nucleus-halogenated derivatives thereof, for example
hydroquinone,
resorcinol,
dihydroxy-diphenyls,
bis-(hydroxy-phenyl)-alkanes,
bis-(hydroxy-phenyl)-cycloalkanes,
bis-(hydroxy-phenyl)-sulphides,
bis-(hydroxy-phenyl)-ethers,
bis-(hydroxy-phenyl)-ketones,
bis-(hydroxy-phenyl)-sulphoxides,
bis-(hydroxy-phenyl)-sulphones, and
α, α'-bis-(hydroxy-phenyl)-diisopropyl-benzenes, and nucleus-alkylated and nucleus-halogenated compounds thereof. These and other suitable diphenols are described in, for example, U.S. Pat. Nos. 3,028,365, 3,275,601; 3,148,172; 3,062,781; 2,991,273; 3,271,367, 2,999,835; 2,970,313 and 2,999,846; in German Offenlegungsschriften Nos. 2,570,703; 2,063,050; 2,063,052; 2,211,956 and 2,211,957; in French Pat. No. 1,651,518 and in the monograph by H. Schnell, "Chemistry and Physics of Polycarbonates", Interscience Publishers, New York 1964.

The most important diphenols are listed in the following:

bisphenol A, tetramethyl-bisphenol A, 1,1-bis-(4-hydroxyphenyl)-isobutane,
1,1-bis-(4-hydroxy-phenyl)-cyclohexane,
4,4'-dihydroxy-diphenyl sulphide, 4,4'-dihydroxy-diphenyl,
4,4'-dihydroxy-diphenyl sulphone, and di- and tetra-halogenated derivatives thereof. Bisphenol A is particularly preferred. Mixtures of the above-mentioned diphenols may also be used.

Preferred aromatic polyesters (a) contain iso-and tere-phthalic acid radicals in a ratio of from 7:3 to 3:7, preferably about 1:1.

Aromatic polycarbonates (b) within the sense of the present invention include homo- and co-polycarbonates based on the diphenols (I) or (II), phosgene, chain terminators and optionally branching agents, and they have a molecular weight $\overline{M}_w$, determined as a weight average, of from 10,000 to 200,000, preferably from 20,000 to 80,000, determined by the light scattering method.

In addition to the diphenols mentioned above for the production of the polyesters (a), the following diphenols are particularly preferred for the production of the polycarbonates (b): 2,4-bis-(4-hydroxyphenyl)-2-methyl-butane, 2,2-bis-(3-methyl-4-hydroxyphenyl)-propane, 2,2-bis-(3,5-dimethyl-4-hydroxy-phenyl)-propane and α,α'-bis-(4-hydroxy-phenyl)-p-diisopropylbenzene. Preferred polycarbonates (b) are copolycarbonates based on bisphenol A and on one of the diphenols mentioned above as being preferred. Polycarbonates which only contain bisphenol A radicals as diphenol radicals are particularly preferred.

The polyester carbonates which are produced according to the present invention are mainly used for the production of mouldings which are to exhibit a high dimensional stability to heat and a high notched impact strength, for example multi-point connectors, lamp mountings and headlight casings.

Processing is usually carried out by injection moulding at a mass temperature of from 280 to 360° C. and at a moulding temperature of from 100 to 200° C.

EXAMPLES

The aromatic polyester "APE" which is used in the following Examples in the form of a 10%, by weight, solution thereof in methylene chloride/chlorobenzene (weight ratio 1:1) is a polyester of bisphenol A, iso-and tere-phthalic acid (mol ratio of iso-: terephthalic acid=1:1) and p-t-butyl phenol as chain terminator having a relative solution viscosity $\eta_{rel}=1.301$, measured in a 0.5%, by weight, solution in methylene chloride at 25° C.

The polycarbonate "PC" which is used in the following Examples in the form of a 10%, by weight, solution thereof in methylene chloride/chlorobenzene (weight ratio 1:1) is a polycarbonate of bisphenol A, phosgene and p-t-butyl phenol as chain terminator having a relative viscosity $\eta_{rel}=1.300$, measured in a 0.5%, by weight, solution in methylene chloride at 25° C.

The test of the notched impact strength $a_k$ according to Charpy was carried out on standard small test bars according to DIN 53 453 at 23° C., in each case on 10 test specimens. The dimensional stability to heat was measured by determining the Vicat B softening temperature according to DIN 53 460. The flowability of the polymers in the melt is assessed by measuring the melt index (MFI) at 320° C. and 21.6 kg load according to DIN 53 735.

EXAMPLES 1 TO 4

10% strength, by weight, solutions of APE and PC were combined in the ratios listed in the Table below. The solvent was evaporated until a solids content of 45%, by weight, was reached; the resulting concentrated solution was introduced into a twin screw evaporation extruder, wherein the residence time at increasing temperatures of from 220° to 280° C. was 50 sec. and the residence time at increasing temperatures of from 280° to 320° C. was another 20 to 60 sec. The resin was extruded in vacuo, and the resulting strand was cooled in water, granulated and dried.

COMPARATIVE EXAMPLES 1 AND 2

Polyester "APE" and polycarbonate "PC" were mixed in the form of the granulates thereof, and extruded on a vacuum twin screw extruder at 360° C.

| Example | Weight ratio APE/PC | Average residence time [sec] | Properties of the extruded products | | | | | |
|---|---|---|---|---|---|---|---|---|
| | | | Vicat B [°C.] | $a_k$ [kJ/m²] | Prior art $a_k$* [kJ/m²] | $\eta_{rel}$ | MFI [g/10 min] | $T_g$ [°C.] |
| 1 | 80/20 | 80 | 182 | 28 | 19 | 1.297 | 36 | 190 |
| 2 | 60/40 | 80 | 173 | 29 | 21 | 1.299 | 57 | 178 |
| 3 | 30/70 | 70 | 161 | 35 | 27 | 1.296 | 134 | 161 |
| 4 | 90/10 | 110 | 185 | 25 | | 1.301 | 20 | 193 |
| Comparison | | | | | | | | |
| 1 | 80/20 | 90 | 177 | 26 | | 1.298 | 29 | 157;198 |
| 2 | 60/40 | 75 | 168 | 28 | | 1.292 | 53 | 153;184 |

*Notched impact strength of polyester carbonates which were produced according to the prior art from bisphenol A, iso- and tere-phthalic acid dichlorides (1:1) and phosgene by the interface process, having different quantities of carbonate structures.

Comparison 3 (with reference to U.S. Pat. No. 4,386,186 to Maresca)

8.3 g (0.05 mol) of isophthalic acid,
8.3 g (0.05 mol) of terephthalic acid,
31.26 g (0.1005 mol) of bisphenol-A diacetate,
7.16 g (corresponding to 0.028155 mol carbonate units) of bisphenol-A polycarbonate (Makrolon 2800 from Bayer) having a relative viscosity of 1.283, and 10.8 g of diphenylether were mixed and treated according to the time/temperature programme of Maresca's Example 1.

For further comparison purposes, samples containing the same ingredients in the same quantities were separately heated in the same manner with the only difference that the reaction was terminated after 1 hour resp. after 2 hours instead of 4 hours. The relative viscosities of the obtained reaction products were determined, and the content of unreacted starting material was estimated by the results of thin layer chromatography. The following results were obtained:

after 1 hour: relative viscosity 1.035, about 30% of unreacted bisphenol-A diacetate, after 2 hours. relative viscosity 1.078, about 15% of unreacted bisphenol-A diacetate, after 4 hours: relative viscosity 1.092, no unreacted bisphenol-A diacetate observed.

The weight ratio APE/PC of this comparative Example is 83/17 which is very similar to the ratio 80/20 of our Example 1. As expected from a relative viscosity of 1.092, the obtained resin was brittle and, therefore, cannot be used for manufacturing articles having a high notched impact strength.

We claim:

1. A process for the production of aromatic polyester carbonates having a molar ratio of ester groups to carbonate groups of from 20:1 to 1:20, characterised in that a solvent-containing mixture which contains (a) aromatic polyester and (b) aromatic polycarbonate in the required ratio, and from 5 to 80%, by weight, of organic solvent based on solvent-containing mixture is melt-extruded at a temperature of from 200 to 440° C. for a residence time of from 20 to 200 sec., while removing the solvent, and maintaining the liquid condition, until the reaction product only has one glass transition temperature.

2. A process according to claim 1, characterised in that the solvent-containing mixture contains from 20 to 70% by weight, of organic solvent.

3. A process according to claim 1, characterised in that the mixture is melt-extruded at a temperature of from 220° to 360° C.

4. A process according to claim 1, characterised in that the residence time is from 25 to 120 sec.

5. A process according to claim 1, characterised in that the solvent is selected from methylene chloride, chloroform, tetrachloroethane, trichloroethylene, tetrachloroethylene, chlorobenzene, dichlorobenzene, toluene, xylene, anisole and mixtures thereof.

6. A process according to claim 1 wherein solvent is removed under reduced pressure.

* * * * *